Oct. 16, 1956        R. L. HARTER        2,766,847
LUBRICATING SYSTEM AND REVERSER THEREFOR
Filed Jan. 27, 1953        2 Sheets-Sheet 1
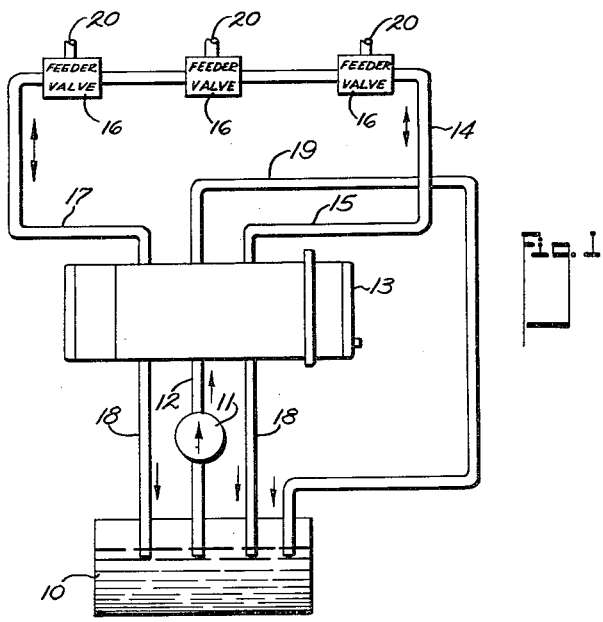
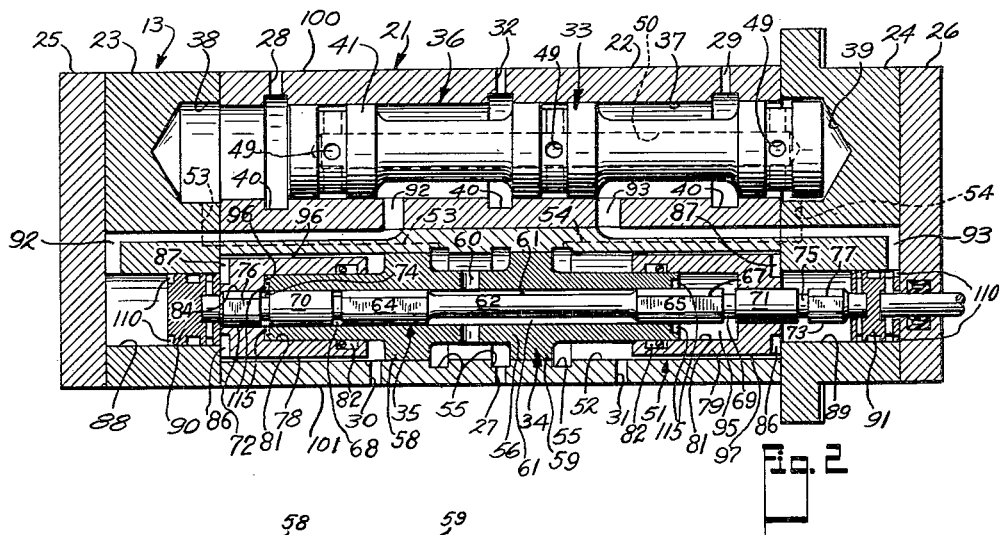
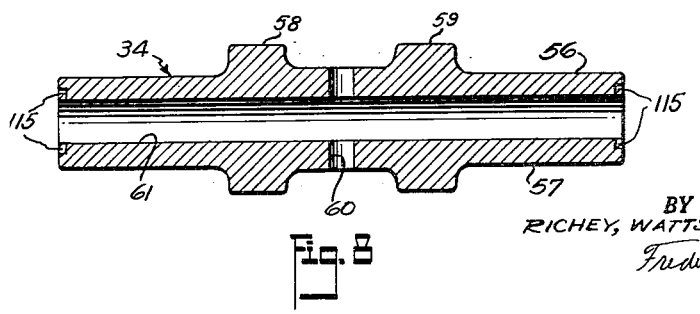
INVENTOR.
ROBERT L. HARTER
BY
RICHEY, WATTS, EDGERTON & McNENNY
ATTORNEYS Oct. 16, 1956 R. L. HARTER 2,766,847
LUBRICATING SYSTEM AND REVERSER THEREFOR
Filed Jan. 27, 1953 2 Sheets-Sheet 2
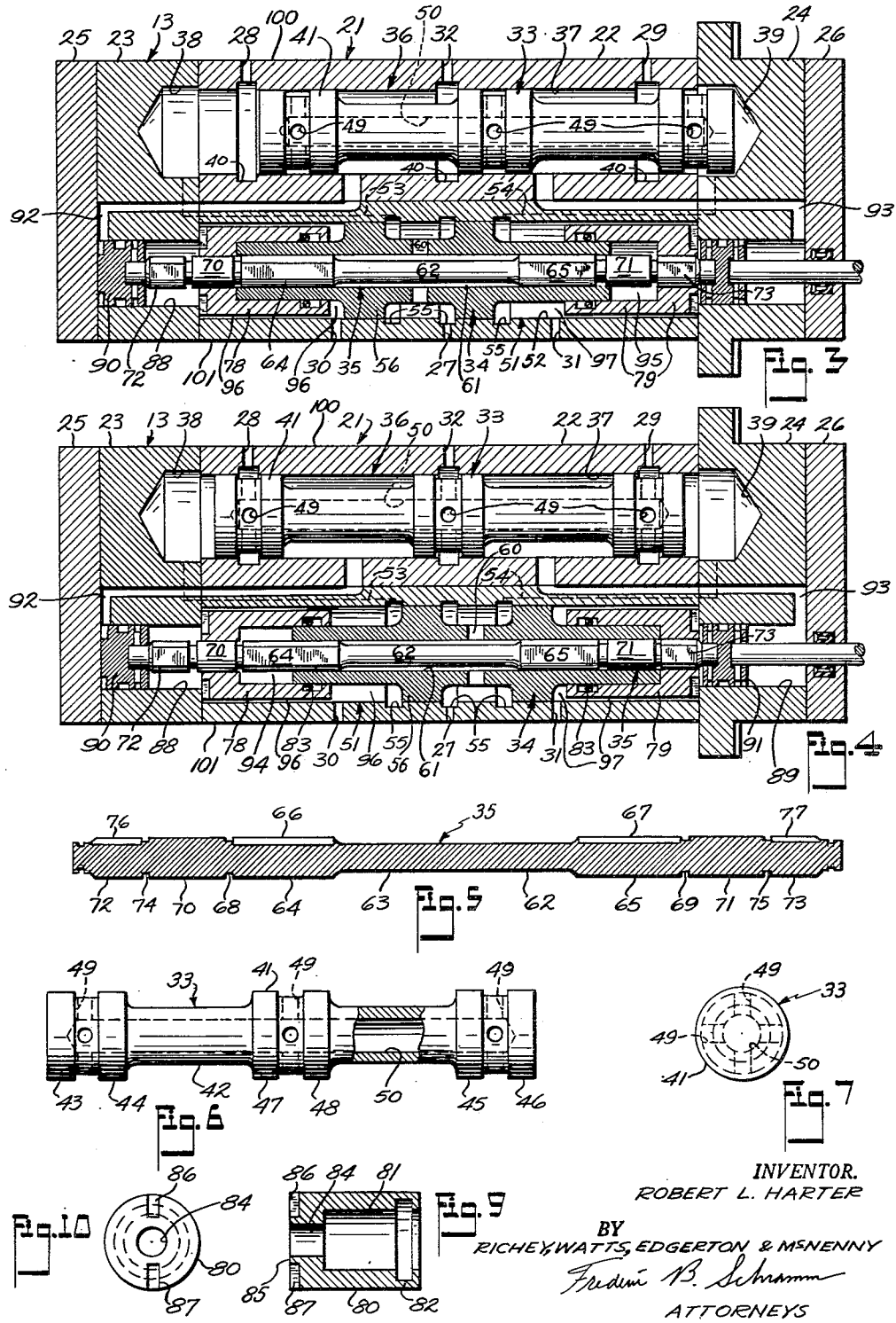
INVENTOR.
ROBERT L. HARTER
BY
RICHEY, WATTS, EDGERTON & McNENNY
ATTORNEYS ![United States Patent Office]

2,766,847
Patented Oct. 16, 1956

2,766,847

LUBRICATING SYSTEM AND REVERSER THEREFOR

Robert L. Harter, Shaker Heights, Ohio, assignor to Trabon Engineering Corporation, Cleveland, Ohio, a corporation of Ohio Application January 27, 1953, Serial No. 333,465

15 Claims. (Cl. 184—7)

This invention relates to lubricating apparatus and, more particularly, to a reverser for reversing the direction of flow of lubricant in closed conduit circuits.

An object of the invention is to reverse the direction of flow of lubricant in a system in which the lubricant is pumped from a sump or reservoir to distributors and then returned to the sump.

Another object of the invention is to reverse the direction of flow of lubricant from a pump into one end of a conduit loop in such a way that the reversal of direction of flow is caused solely by the emergence of lubricant from the remaining end of the loop.

Still another object of the invention is to alleviate the effects of compressibility of lubricants in systems having extended conduits or in other arrangements where high lubricant pressures are encountered.

A further object of the invention is to provide an improved reverser for the accomplishment of the above-referenced objects and one which is also of relatively simple construction and readily and economically manufactured.

A still further object of the invention is the simplification of valves for lubricating apparatus.

There is described in application, Serial No. 113,189, filed August 30, 1949 in the United States Patent Office, by Robert L. Harter and entitled "Reversing Valve," now Patent No. 2,684,732, issued on July 27, 1954, a valve which is adapted to reverse the direction of flow of lubricant in systems in which a pump is utilized to pump grease from a sump or reservoir through an extended feed conduit to a series of feeder valves and back to the sump. The reverser which forms the subject of that invention is utilized to alternately connect the outlet of the pump to either end of the feed conduit. As the fluid flows from the pump through the reverser and through the conduit and back to the reverser valve, the return fluid is utilized to actuate a pilot valve piston which causes the lubricant to shift the position of a diverter valve piston. The diverter piston in turn causes a flow-reversing piston to shift its position and connect the pump to the opposite end of the conduit loop.

The reverser is characterized in that upon motion of the flow-reversing piston to change the direction of fluid flow, the end of the conduit which had been receiving the grease from the pump and in which a high pressure had been built up is temporarily connected to an exhaust outlet by the valve to relieve those high pressures before being connected to the pilot valve. Such an arrangement serves to eliminate false action of the pilot valve due to the expansion of the fluid in the previously fed end of the conduit loop.

The present invention relates to an improved reverser incorporating an improved diverter valve and an improved flow-reversing piston and a novel method for further mitigating the effects of the accumulated pressures at the feed end of the conduit loop. More specifically, the latter aspect of the invention contemplates a flow-reversing piston which simultaneously interconnects the ends of the conduit loop during the interval in which the flow-reversing piston moves from one end of the cylinder to the remaining end. Such a temporary interconnection serves to equalize the pressures in the two ends of the conduit loop.

In another aspect, the invention contemplates also such a simultaneous interconnection of the ends of the conduit loop and also a connection of the ends of the conduit loop with an exhaust or outlet to return excess fluid to the sump.

The invention together with further objects, features and advantages thereof will be more readily understood from a consideration of the following detailed specification and claims taken in connection with the appended drawings, in which:

Fig. 1 is a schematic diagram of a lubricant distribution system of the type to which the present invention relates;

Fig. 2 is a vertical view of the improved reversing valve taken in a longitudinal direction and showing the valve members partly in section and partly in cutaway;

Fig. 3 is a view similar to Fig. 2 but showing a successive step in the operation of the pilot valve;

Fig. 4 is a view similar to Fig. 3 but showing the next succeeding step of the pilot valve and of the diverter valve and also the intermediate position of the flow-reversing piston;

Fig. 5 is a longitudinal section of the pilot rod;

Fig. 6 is a longitudinal section of the novel flow-reversing piston;

Fig. 7 is an end view of the piston of Fig. 6;

Fig. 8 is a longitudinal section of the diverter valve member;

Fig. 9 is a longitudinal section of the novel valve cap; and

Fig. 10 is an end view of the valve cap of Fig. 9.

Referring now to Fig. 1, the lubricating system to which the invention relates comprises a sump 10 for holding grease or other suitable lubricant; a pump 11 for drawing grease from the sump; and an inlet or supply conduit for conducting lubricant from the pump to the reverser 13. The reverser 13 controls the flow of lubricant to a feed conduit 14 which is formed in a loop extending from the reverser 13 at one end 15 of the conduit to a series of feeder valves 16 and back to the reverser at the remaining end 17 of the conduit. The lubricant returned to the reverser from the unfed end of the conduit 14 is returned to the sump 10 by exhaust conduits 18 and 19. Lubricant is distributed to the various bearings or other lubricant using apparatus from the feeder valve by conduits 20.

Referring now to Fig. 2, the reverser 13 comprises a housing 21 including a central piece 22, end pieces 23 and 24 and end caps 25 and 26. Each of the afore-named pieces is bored and machined to cooperate with the remaining pieces of the housing to constitute an operational assembly. The separate pieces may be fastened together in any suitable fashion.

The center piece 22 includes an inlet opening 27 adapted to be connected to the conduit 12; an outlet opening 28 adapted to be connected to the end 17 of the feed conduit 14, and an outlet opening 29 adapted to be connected to the end 15 of the feed conduit. Lower exhaust openings 30 and 31 are adapted to be connected to the exhaust conduits 18 while an upper exhaust opening 32 is adapted to be connected to the exhaust conduit 19. The ends of the conduit 14 may be connected to the body of the reverser by any suitable connector.

The reverser 13 incorporates a flow-reversing valve, designated generally at 33, a diverter valve, designated generally at 34, and a pilot valve, designated generally at 35, for interconnecting the various inlets and outlets so as to reverse the flow of lubricant through the feed conduits.

The flow-reversing valve 33 includes a cylinder 36 which comprises opening 37 in the central piece 22, and cooperating openings 38 and 39 in the end pieces 23 and 24. Each of the openings 28, 29 and 32 intersect the opening 37 to form ports for the valve and each opening has an associated annular groove 40 formed in the central piece 22 circumferentially about the opening 37. These grooves improve the flow of lubricant to and from the ports by permitting a gradual diversion of the lubricant flow as the piston moves along the cylinder. The ports formed by the outlet openings 28 and 29 may be designated as outlet ports while the port formed by the exhaust opening 32 may be designated as an exhaust port.

The flow-reversing valve 33 includes a piston 41 adapted to move from one end of the cylinder 36 to the other end for reversing the direction of flow in the feed conduit 14. As shown particularly in Fig. 6, the piston 41 comprises an elongated cylindrical body member 42 having spaced lands 43 and 44 and 45 and 46 at the ends thereof and similar lands 47 and 48 centrally disposed between the end lands. A plurality of openings 49 transversely through the body 42 of the piston and disposed between the lands provide fluid communication between the space between the lands and an opening 50 along the interior of the body of the piston. As will be subsequently explained, the openings 49 and 50 serve to equalize excessive pressures in the feed conduits and constitute an important part of the invention.

The diverter valve 34 comprises a cylinder 51 including an opening 52 longitudinally through the central piece 22. The inlet opening 27 intersects the cylinder opening 52 to form an inlet port for the diverter valve, and for the reverser, while two passages 53 and 54 extending between the diverter valve and the flow-reversing valve intersect the opening 52 to form outlet ports for the diverter valve. Annular grooves 55 disposed circumferentially about the opening 52 at the openings 27 and at the ends of passages 53 and 54 are provided to improve the flow of lubricant to and from the ports in the same fashion as the corresponding grooves in the flow-reversing cylinder 36.

The passages 53 and 54 intersect the cylinder opening 37 in the end pieces 23 and 24 and form reverser inlet drive ports for the flow-reversing valve.

The diverter valve 34 includes a piston 56 for interconnecting the inlet opening 27 with either of the passages 53 or 54 and the remaining passage with a corresponding one of the two exhaust openings 30 or 31. As is shown in detail in Fig. 8, the piston 56 comprises an elongated cylindrical body 57 having two spaced lands 58 and 59 disposed at either side of the center of the body. The lands 58 and 59 are adapted to engage the walls of the cylinder opening 52 and any suitable known means (not shown) may be employed to form a lubricant-tight seal between the lands and the walls of the opening. An opening 60 transversely through the body member 57 provides fluid communication from the space between the lands to an opening 61 longitudinally through the center of the body 57.

The opening 61 through the piston 56 is adapted to receive a pilot rod 62 which cooperates with the piston 56 to form a pilot valve, the opening 61 comprising a cylinder opening for the pilot valve.

As shown in Fig. 5, the pilot rod 62 comprises an elongated cylindrical body 63 having three spaced lands at each end thereof. Two inner lands 64 and 65 incorporate longitudinal grooves 66 and 67 along the length thereof to permit flow of lubricant between the pilot rod 62 and the piston 56 to the associated circumferential grooves 68 and 69. Groove 68 is formed between inner land 64 and middle land 70 and groove 69 is formed between inner land 65 and middle land 71. Lands 70 and 71 have close fitting, lubricant-flow-preventing engagement with the cylindrical surface of opening 61 and also with the cylindrical surfaces of openings 84 in caps 78 and 79. Two outer lands 72 and 73 cooperate with the lands 70 and 71 to define circumferential grooves 74 and 75 while the lands 72 and 73 incorporate longitudinal grooves 76 and 77 to permit flow of lubricant between grooves 74 and 75 and the end of the pilot rod. The nature of the longitudinal grooves in the lands 64 and 65 and 72 and 73 will be clearly evident from the sectional view of Fig. 5.

In accordance with the invention, valve caps 78 and 79 are provided at the ends of the cylinder opening 52. The valve caps cooperate with the diverter valve piston 56 and the pilot rod 62 to determine the movement of the piston 56. As shown particularly in Figs. 9 and 10, each valve cap comprises an annular cup-shaped member 80 having an outside diameter sufficiently less than the diameter of the cylinder opening 52 to permit flow of lubricant between the cap and the cylinder wall. An internal opening 81 is of sufficient size to receive the end of the diverter valve piston 56 while a recess 82 is provided for a fluid-sealing means such as an O-ring 83. An opening 84 at the closed end of the member 80 receives the lands of the pilot rod 62 and is of a diameter such that the lands may slide smoothly through the opening without permitting any substantial flow of lubricant between the surface of the land and the surface of the opening. The end 85 of the member 80 is surfaced for a smooth fit against the inner wall of the end pieces 23 and 24 while radially directed grooves 86 and 87 are provided to permit fluid flow between openings 88 and 89 in the end pieces 23 and 24 and the cylinder opening 52. The cooperating surfaces of the valve caps, the diverter valve piston 56 and the pilot rod 62 may preferably be ground to provide the necessary smooth sliding fit.

The pilot rod 62 is actuated by pistons 90 and 91 which are connected to the pilot rod 62 at points beyond the end valve lands 72 and 73 and slide in the openings 88 and 89 which serve as cylinder openings. The ends of the openings 88 and 89 are connected to the flow-reversing cylinder opening 37 by passages 92 and 93 comprising openings in the end pieces 23 and 24 and in the central piece 22. The pilot pistons 90 and 91, therefore, actuate the pilot rod as lubricant is received into the cylinder openings 88 and 89 from the flow-reversing valve.

The intersection of the passages 92 and 93 with the openings 88 and 89 constitute diverter drive ports for the pistons 90 and 91 while the intersection of those passages with the cylinder opening 37 constitutes exhaust ports for the flow-reversing valve 33.

It will be seen that the valve caps 78 and 79 form enclosed spaces 94 and 95 with the ends of the diverter valve piston 56 and enclosed spaces 96 and 97 with the central piece 22, the end pieces 23 and 24 and the outside surface and the lands of the diverter valve piston 56. The exhaust openings 30 and 31 and exhaust conduits 18 provide communication between the spaces 96 and 97 and the sump 10.

It will be understood that the conduits 53 and 54 serve alternately as drive inlet ports to conduct lubricant under pressure into the ends of reverser cylinder 36 and as outlet exhaust ports for lubricant from the ends of chamber 36 through the diverter cylinder and its exhaust ports 30 and 31. It will also be understood that conduits 92 and 93 serve alternately as outlet drive ports from the reverser cylinder 36 to deliver lubricant under pressure into the ends of pilot piston cylinders 88 and 89 for propelling the pistons therein and outlet passages to conduct exhaust lubricant from the pilot cylinders through the reverser valve to exhaust port 32.

It will be noted that pistons 90 and 91 and the ends of diverter valve 34 are provided with spaces similar to those provided on the ends of cup-shaped members 80 for the application of fluid pressure thereagainst. Cups 80 have spaces 86 and 87 formed thereon so that lubricant from cylinders 88 and 89 may pass between the ends of the cups and the adjacent opposed parts of the apparatus. Similarly pistons 90 and 91 are provided with recesses 110 so that lubricant under pressure may engage the ends of the pistons when they are in close proximity to caps 25 or 26. Similarly the ends of diverter valve 34 are provided with recesses 115 so that lubricant under pressure may flow between the ends of this valve and the inner surface of cup-shaped members 80 and apply fluid pressure to the valve.

Starting with the disposition of the parts of the reverser as shown in Fig. 2, the operation of the reverser is as follows:

Lubricant flows from the sump 10 and the pump 11 through the conduit 12 and into the inlet opening 27. The leftward position of the diverter valve piston 56 connects the inlet opening 27 with the passage 53 so that lubricant flows through the passage 53 into the left end of the flow-reversing cylinder opening 37 and out the outlet opening 28. The lubricant then flows through the conduit 14 through the feeder valves 16, back to the reverser and into the flow-reversing cylinder 37 through the outlet opening 29. Inasmuch as the outlet opening 29 is connected with the passage 93 by the flow-reversing piston 41, the lubricant then flows into the cylinder 89 and forces the pilot piston 91 and the pilot rod 62 to the left, as is shown in Fig. 3.

During this period, lubricant has been flowing from the inlet opening 27 through the opening 60 and the opening 61 in the body of the diverter valve piston 56 and through the pilot rod groove 67 into the space 95. Inasmuch as the opening 84 of the valve cap 79 is closed by the land 71, the pressure of the lubricant upon the end of the piston 56 and the inner end of the valve cap maintains the piston in the leftward position.

Upon movement of the pilot rod to the left as shown in Fig. 3, the latter flow of lubricant is changed as follows:

The land 71 has moved to the left sufficiently to close the right end of the opening 61 while the land 64 has moved sufficiently to the left to open the left end of the opening 61 through the groove 66. Concurrently therewith, the opening 84 of the left valve cap 78 has been closed by the land 70 to close the chamber 94 while the land 73 has moved into the opening 84 of valve cap 79 to open the chamber 95. Lubricant thus flows from the opening 27 through the opening 60 and leftward in the opening 61 and in the chamber 94, forcing the diverter valve piston 56 to the right. The lubricant in the chamber 95 moves through the groove 77 in the land 73, through the grooves 86 and 87 in the end cap 79 and into the chamber 97. Excess lubricant in the chamber 97 may escape through the outlet 31 and through the conduit 18 to return to the sump.

As shown in Fig. 4, the movement of the diverter valve piston 56 to the right causes the inlet opening 27 to become connected with the passage 54 and the passage 53 with the chamber 96 and the outlet opening 30. The lubricant thus flows through the passage 54 and the right drive port of the flow-reversing valve into the right-hand end of the flow-reversing cylinder opening 37. The piston 41 is forced toward the left end of the cylinder by the pressure exerted by the grease upon the end of the piston.

As the piston 41 moves to the left, an equalizing position is reached, as shown in Fig. 4, wherein the openings 28, 32 and 29 are all interconnected by the openings 49 and 50 in the flow-reversing piston 41. The highly compressed fluid in the conduit 14 is thus allowed to flow into the piston 41 which is open to the sump with the result that the pressure of lubricant in the conduit is promptly reduced to that existing in the sump and any excess fluid may escape through the exhaust opening 32 to be returned to the sump 10 by the conduit 19.

During the period between the time when the diverter valve piston 56 is moved to the right to connect the inlet opening 27 to the right end of the cylinder opening 37 and the time when the equalizing position of the piston 41 shown in Fig. 4 is reached, a preliminary relief of the high pressures in the end 17 of the conduit 14 is accomplished through the passage 53 which has been connected to the exhaust opening 30 by the diverter valve piston 56. The lubricant in the conduit and also in the left end of the piston opening 37 is free to expand and cannot affect the various valve members so as to cause a false operation thereof.

As the reversing piston 41 reaches its leftmost position, passage 54 is connected with the outlet opening 29 and the lubricant is free to flow from the inlet opening 27 into the end 15 of the conduit 14. Simultaneously, the outlet opening 28 is connected to the passage 92 and, as the lubricant is returned to the reverser, it flows through the passage 92 into the left end of the cylinder 88 and forces the pilot piston 90 and pilot rod 62 to the right. The valving cycle is thereupon repeated in a sequence opposite to that just described until the valve members reach the position shown in Fig. 1 and a cycle of operation is complete.

The central piece 22 of the housing 21 is formed in two pieces including an upper piece 100 and a lower piece 101. The upper piece incorporates the flow-reversing valve 33 including the cylinder opening 37. The opening 37 extends longitudinally through the piece 100 while the port passages extend to the cylinder from the top and bottom sides of the piece. The lower piece 101 incorporates the diverter valve 34 and the pilot valve 35 including the cylinder opening 52. The passages which form the port openings extend to the cylinder opening from the top and bottom sides of the piece as in the upper piece. Additionally, portions of the passages 53 and 54 and 92 and 93 are formed as grooves in the upper surface of the lower piece. The adjoining surfaces of the upper and lower pieces are ground so as to produce a smooth fluid-tight fit. The pieces may be secured together in any suitable fashion. It will be seen that the manufacturing process is greatly expedited by such a composite construction of the housing.

It is to be understood that the specific nature of the present disclosure is not intended to be restrictive or confining and that various rearrangements of parts and modifications of design may be resorted to without departing from the scope or spirit of the invention as herein claimed.

What is claimed is:

1. A fluid distributing system comprising, in combination, a fluid distributing conduit adapted to receive lubricant alternately at either end thereof to be transmitted to a plurality of feeders and to the remaining end of the conduit, and a fluid reverser adapted to supply lubricant to the conduit comprising a flow reversing valve including a cylinder having two outlet ports connected to the ends of said conduit and a piston in the cylinder, the said piston including openings for simultaneously interconnecting the outlet ports at an intermediate position of the piston whereby excessive pressures in the conduit system may be relieved, drive ports at the ends of said cylinder, each drive port being communicable through the cylinder with an associated adjacent outlet port when the piston is at the remaining end of the cylinder, a main inlet port and valve means connected to said main inlet port and said drive ports for connecting said main inlet port to either of said drive ports.

2. A fluid distributing system comprising, in combination, a fluid distributing conduit adapted to receive lubricant alternately at either end thereof to be transmitted to a plurality of feeders and to the remaining end of the conduit, and a fluid reverser adapted to supply lubricant to the conduit comprising a flow reversing valve including a cylinder having two outlet ports connected to the ends of said conduit, an exhaust port disposed between the two outlet ports and a piston in the cylinder, the said piston including three pairs of spaced lands engaging the cylinder, an opening extending longitudinally within the piston and an opening between each pair of lands communicating with the internal opening, the distance between the pairs of lands and that of the ports being substantially equal to provide simultaneous communication between the ports at an intermediate position of the piston whereby excessive pressures in the conduit system may be relieved, drive ports at the ends of said cylinder, each drive port being communicable through the cylinder with an associated adjacent outlet port when the piston is at the remaining end of the cylinder, a main inlet port, and valve means connected to said main inlet port and said drive ports for connecting said main inlet port to either of said drive ports.

3. A fluid distributing system comprising, in combination, a fluid distributing conduit adapted to receive lubricant alternately at either end thereof to be transmitted to a plurality of feeders and to the remaining end of the conduit, and a fluid reverser adapted to supply lubricant to the conduit comprising a flow reversing valve including a cylinder having two outlet ports connected to the ends of said conduit, an exhaust port disposed between the two outlet ports and a piston in the cylinder, the said piston including three pairs of spaced lands engaging the cylinder, an opening extending longitudinally within the piston and an opening between each pair of lands communicating with the internal opening, the distance between the pairs of lands and that of the ports being substantially equal to provide simultaneous communication between the ports at an intermediate position of the piston whereby excessive pressures in the conduit system may be relieved, drive ports at the ends of said cylinder, each drive port being communicable through the cylinder with an associated adjacent outlet port when the piston is at the remaining end of the cylinder, a main inlet port, and valve means connected to said main inlet port and said drive ports for connecting said main inlet port to either of said drive ports, the said valve means being operatively connected with the said outlet ports by the said reverser piston for operatively actuating the valve means with lubricant returned to the reverser at the remaining end of the conduit.

4. In a fluid reverser, a housing having a diverter cylinder and a reverser cylinder, said diverter cylinder having a centrally disposed inlet port, and an outlet port at each side of the inlet port connected to the ends of the reverser cylinder, a diverter valve in the diverter cylinder having two spaced lands in engagement with the walls of the cylinder and including an opening extending longitudinally therethrough and an opening extending radially therethrough between the lands for admitting lubricant from the inlet port to the said longitudinal opening, endwise movement of the valve in the cylinder serving to interconnect the inlet port with either of the outlet ports, cap members at the ends of the diverter cylinder and slidingly receiving the ends of said valve, a pilot valve rod extending through the diverter valve and the cap members and having at each end inner, middle and outer lands, the middle lands having fluid-tight engagement with the valve and the cap members, and the inner and outer lands having longitudinal grooves for permitting lubricant to flow into and out of the cap members, a flow reversing valve in said reverser cylinder and means actuated by lubricant under pressure from said reverser cylinder for moving said pilot rod endwise.

5. In a fluid reverser, a housing having a diverter cylinder and a reverser cylinder, said diverter cylinder having a centrally disposed inlet port and an outlet port at each side of the inlet port connected to the ends of the reverser cylinder and a pilot cylinder at each end of the diverter cylinder, a diverter valve in the diverter cylinder having two spaced lands in engagement with the walls of the cylinder and including an opening longitudinally through the member and an opening radially through the member between the lands for admitting lubricant from the inlet port to the said longitudinal opening, endwise movement of the valve in the cylinder serving to interconnect the inlet port with either of the outlet ports, cap members at the ends of the diverter cylinder and slidingly receiving the ends of said valve, a pilot valve rod extending through said valve and the cap members and pilot pistons at the ends of the rod in the pilot cylinders, the valve rod including inner, middle and outer spaced lands at each end thereof, the middle lands being adapted to make fluid-tight engagement with the valve member and the cap members, and the inner and outer lands having longitudinal grooves for permitting lubricant to flow into and out of the cap members, a flow reversing piston in said reverser cylinder, and conduits for conducting lubricant under pressure from said reverser cylinder to said pilot cylinders and thereby actuating said pilot pistons and rod.

6. In a fluid reverser, a housing having a diverter cylinder and a reverser cylinder, said diverter cylinder having a centrally disposed inlet port, an outlet port at each side of the inlet port connected to the ends of the reverser cylinder, exhaust ports at each side of the inlet port, and a pilot cylinder at each end of the diverter cylinder, a diverter valve in the diverter cylinder having two spaced land portions in engagement with the walls of the cylinder and including an opening longitudinally through the member and an opening radially through the member between the lands for admitting lubricant from the inlet port to the said longitudinal opening, endwise movement of the valve in the cylinder serving to interconnect the inlet port with either of the outlet ports, cap members at the ends of the diverter cylinder and slidingly receiving the ends of said valve, a pilot valve rod extending through the diverter valve and the cap members and a pilot piston on each end of the rod in the pilot cylinders, the valve rod having at each end inner, middle and outer lands, the middle lands having fluid-tight engagement with the valve and the cap member, and the inner and outer members having longitudinal grooves for permitting lubricant to flow into the cap members and to and from the cap members to said exhaust ports, a flow reversing piston in said reverser cylinder and conduits connecting intermediate parts of said reverser cylinder with said pilot cylinders for conducting lubricant from said reverser cylinder for moving said pilot valve endwise and thereby causing the diverter valve to move endwise.

7. A reverser for lubricating systems comprising a housing, a flow reversing valve in the housing including a cylinder having an exhaust port positioned centrally thereof, an outlet port at each side of the exhaust port, a valve port at each side of the exhaust port and between the exhaust port and the outlet port, and drive ports at the ends of the cylinder, a piston in the cylinder for operatively interconnecting the drive port and the outlet port and the valve port and the exhaust port at one end of the cylinder and the outlet port and the valve port at the other end of the cylinder when the piston is at either end of the cylinder, the piston including three pairs of spaced lands and openings within the piston interconnecting the spaces between the lands, the distance between the pairs of lands and the exhaust port and the outlet ports being substantially equal to provide simultaneous intercommunication between those ports at an intermediate position of the piston, a main inlet port in the housing and valve means connected to said valve ports and responsive to flow of fluid therefrom for interconnecting said main inlet with either of said drive ports.

8. The invention in accordance with claim 7, said last named means comprising a valve cylinder, an inlet port connected to the main inlet, an outlet port at each side of the inlet port, each connected to a drive port, a valve member having two spaced lands in the valve cylinder for interconnecting the inlet port with either of the outlet ports, and a pilot rod through the valve member, a pilot cylinder at each end of the valve cylinder and pilot pistons at the ends of the rod actuated by flow of fluid from the valve ports to the pilot cylinders for controlling the position of the valve member.

9. A lubricating system comprising, in combination, a feeder circuit for distributing lubricant including a conduit adapted to receive lubricant at either of two ends thereof and permit flow of excess lubricant from the remaining end, a sump for holding lubricant, a pump connected to the sump for supplying lubricant to the feeder circuit and a fluid reverser having a main inlet connected to the pump and including a cylinder having two main outlets connected to the two ends of the feeder circuit for alternately transmitting lubricant through the feeder circuit first in one direction and then in the other direction, and two drive ports, and a piston in said cylinder having an opening longitudinally within the piston for simultaneously interconnecting the said outlets to equalize the pressure of lubricant fluid in said reverser, and valve means responsive to pressure of excess lubricant from the remaining end of the feeder circuit for transmitting lubricant from the main inlet through said drive ports first to one end and then to the other end of the flow reversing cylinder for moving the piston endwise and supplying lubricant to the feeder circuit.

10. A lubricating system comprising, in combination, a feeder circuit for distributing lubricant including a conduit adapted to receive lubricant at either of two ends thereof and permit flow of excess lubricant from the remaining end, a sump for holding lubricant, a pump connected to the sump for supplying lubricant to the feeder circuit, and a fluid reverser having a main inlet connected to the pump and including a cylinder having two main outlets connected to the two ends of the feeder circuit for alternately transmitting lubricant through the feeder circuit, first in one direction and then in the other direction, an exhaust outlet leading therefrom for returning excess lubricant to the sump, two inlet drive ports and the two outlet drive ports, and a piston having an opening longitudinally within the piston for simultaneously interconnecting said outlets to equalize the pressure of lubricant fluid therein, a diverter valve for transmitting lubricant from the main inlet through said inlet drive ports, first to one end of the flow reversing cylinder and then to the remaining end thereof and a pilot valve adapted to receive excess lubricant through said outlet drive ports from either end of the fluid circuit for shifting the diverter valve in response thereto.

11. A lubricating system comprising the combination of a sump for holding lubricant, a feeder circuit for distributing lubricant adapted to receive lubricant at either of two ends and permit flow of excess lubricant from the remaining end, a reverser connected to the two ends of the circuit and to the sump, the reverser including a diverter valve and a diverter valve piston, a flow reversing valve and a flow reversing valve piston and a pilot valve having two opposed pilot valve pistons, and a pump connected to the sump and to the reverser for forcing lubricant from the sump into the reverser to actuate the diverter and flow reversing valve pistons and thence through the feeder circuit to actuate the pilot pistons and thereby control the actuation of the diverter and flow reversing pistons, the flow reversing piston having spaced lands for simultaneously changing the connection of one end of the feeder circuit from the diverter valve to the pilot valve and the remaining end of the feeder from the pilot valve to the diverter valve at either end of the feeder and the said lands comprising spaced land portions and an opening longitudinally through the interior of the piston for interconnecting the ends of the feeder circuit to relieve excess lubricant pressure when the flow reversing piston is in an intermediate position for neutralizing excess lubricant pressure.

12. The invention in accordance with claim 11 and including an exhaust outlet from the reverser positioned for simultaneous connection through the reverser with both ends of the feeder circuit for returning excess lubricant to the sump.

13. Apparatus for distributing a lubricant comprising a pump to be connected to a source of lubricant, a reverser connected to said pump to receive lubricant under pressure therefrom, a conduit having its ends connected to said reverser, movable means in the reverser cooperating with the ends of said conduit to interrupt the flow of pump delivered lubricant into one end of the conduit, to connect the ends of the conduit together and to said source of lubricant, and to permit pump delivered lubricant to flow into the other end of the conduit, and hydraulically actuated shiftable means in the reverser to move said movable means, said shiftable means being hydraulically operated in part by the flow of lubricant under pressure from the conduit to move said movable means, and in part by the pumped lubricant.

14. Apparatus for distributing a lubricant comprising a pump to be connected to a source of lubricant, a reverser connected to said pump to receive lubricant under pressure therefrom, a conduit having its ends connected to said reverser, a movable valve in the reverser and having passages therein, said valve serving when moved to reverse the flow of pump delivered lubricant in the conduit, said passages serving during such movement of the valve to connect the ends of the conduit together and to said source of lubricant, and hydraulically actuated shiftable means in the reverser to move said movable valve, said shiftable means having a part hydraulically operated by the flow of lubricant under pressure from the conduit to move said movable valve, and having another part hydraulically operated by the pumped lubricant.

15. Apparatus for distributing a lubricant comprising a pump to be connected to a source of lubricant, a reverser including a cylinder having inlets for alternate connection to said pump to receive lubricant under pressure therefrom, and an outlet connected to said source of lubricant, a conduit having its ends connected to said cylinder, a valve movable endwise in said cylinder alternately to connect one of said inlets with one of said ends of the conduit, said valve having a longitudinal passage and intersecting transverse passages alignable with the ends of said conduit and said outlet, and means in the reverser to move said valve, said means including a pilot valve responsive to the flow of lubricant from the conduit through said cylinder, and a diverter valve responsive to the flow of pump delivered lubricant to direct such lubricant against said movable valve to move it in its cylinder and thereby to reverse the flow of pump delivered lubricant through the conduit.

References Cited in the file of this patent

UNITED STATES PATENTS

| Number | Name | Date |
|---|---|---|
| 734,285 | Thomann | July 21, 1903 |
| 1,292,013 | Munger | Jan. 21, 1919 |
| 1,896,052 | Ferris | Jan. 31, 1933 |
| 2,022,005 | Leonard | Nov. 26, 1935 |
| 2,027,171 | Hillis | Jan. 7, 1936 |
| 2,068,391 | Acker | Jan. 19, 1937 |
| 2,232,307 | Barker | Feb. 18, 1941 |
| 2,511,779 | Leonard | June 13, 1950 |
| 2,561,786 | Davis | July 24, 1951 |
| 2,585,189 | Tear | Feb. 12, 1952 |